(12) United States Patent
Moore et al.

(10) Patent No.: US 11,307,422 B2
(45) Date of Patent: Apr. 19, 2022

(54) SYSTEMS AND DEVICES FOR CONNECTING PARTS OF A GLASSES FRAME

(71) Applicant: GOOGLE LLC, Mountain View, CA (US)

(72) Inventors: Joshua Moore, Elora (CA); Joshua Tiffin, Waterloo (CA); Victor Nobre, Kitchener (CA)

(73) Assignee: Google LLC, Mountain View, CA (US)

( * ) Notice: Subject to any disclaimer, the term of this patent is extended or adjusted under 35 U.S.C. 154(b) by 264 days.

(21) Appl. No.: 16/668,149

(22) Filed: Oct. 30, 2019

(65) Prior Publication Data

US 2020/0142203 A1 May 7, 2020

Related U.S. Application Data

(60) Provisional application No. 62/754,311, filed on Nov. 1, 2018.

(51) Int. Cl.
*G02B 27/01* (2006.01)
*G02C 11/00* (2006.01)

(52) U.S. Cl.
CPC .......... *G02B 27/0176* (2013.01); *G02C 11/10* (2013.01); *G02B 2027/0178* (2013.01)

(58) Field of Classification Search
CPC . G02C 11/10; G02C 1/10; G02C 5/14; G02C 5/145; G02C 5/22; G02B 27/0176; G02B 27/0178
USPC ....... 351/158, 41, 49, 153, 116, 121; 16/228
See application file for complete search history.

(56) References Cited

U.S. PATENT DOCUMENTS

| | | | |
|---|---|---|---|
| 2010/0296045 A1* | 11/2010 | Agnoli | G02C 5/146 351/158 |
| 2015/0185765 A1* | 7/2015 | Peek | G06F 1/1684 351/158 |

* cited by examiner

*Primary Examiner* — Marin Pichler

(57) ABSTRACT

There is provided a glasses frame comprising a front frame having a first end piece to connect to a first temple arm. The glasses frame also comprises a first electrical contact physically coupled to the front frame at the first end piece. In addition, the glasses frame comprises the first temple arm, which has a first end connector to connect to the first end piece. Moreover, the first end connector is slideably mateable with the first end piece along a first slide path. The first end connector has a second electrical contact disposed along at least a portion of a first connection surface of the first end connector. Furthermore, the second electrical contact is to electrically connect with the first electrical contact when the first end connector is slideably mated with the first end piece.

20 Claims, 22 Drawing Sheets

SYSTEMS AND DEVICES FOR CONNECTING PARTS OF A GLASSES FRAME

FIELD

The present systems and devices relate generally to systems and devices for connecting parts of a glasses frame, and particularly to systems and devices for connecting parts of a smart glasses frame.

BACKGROUND

Glasses frames may be assembled from multiple parts, such as a front frame and one or more temple arms. Smart glasses may comprise glasses that provide functionality other than or in addition to using a lens to modify light entering a user's eye. For example, smart glasses may receive, process, or communicate to the user information in different forms, such as light, sound, or touch.

In some examples, smart glasses may comprise a head-mounted display. A head-mounted display is an electronic device that is worn on a user's head and, when so worn, secures at least one electronic display within a viewable field of at least one of the user's eyes, regardless of the position or orientation of the user's head. A wearable heads-up display (WHUD), in turn, is a head-mounted display that enables the user to see displayed content but also does not prevent the user from being able to see their external environment. The "display" component of a WHUD is either transparent or at a periphery of the user's field of view so that it does not completely block the user from being able to see their external environment. Examples of WHUDs include: the Google Glass®, the Optinvent Ora®, the Epson Moverio®, and the Sony Glasstron®, just to name a few.

BRIEF SUMMARY

According to an aspect of the present systems and devices, there is provided a glasses frame comprising: a front frame having a first end piece to connect to a first temple arm and a first electrical contact physically coupled to the front frame at the first end piece. The glasses frame also comprises the first temple arm having a first end connector to connect to the first end piece. The first end connector is slideably mateable with the first end piece along a first slide path. The first end connector has a second electrical contact disposed along at least a portion of a first connection surface of the first end connector. The second electrical contact is to electrically connect with the first electrical contact when the first end connector is slideably mated with the first end piece.

The second electrical contact may comprise an elongated strip of conductive material oriented longitudinally along the first slide path.

The glasses frame may further comprise a third electrical contact physically coupled to the front frame at the first end piece, the third electrical contact electrically insulated from the first electrical contact. The first end connector may further comprise a fourth electrical contact comprising a respective elongated strip of conductive material extending along at least a respective portion of the first connection surface and oriented longitudinally along the first slide path. The fourth electrical contact may be electrically insulated from the second electrical contact. The fourth electrical contact may be to electrically connect with the third electrical contact when the first end connector is slideably mated with the first end piece. The first connection surface may define a plane intersecting a longitudinal axis of the first temple arm.

The glasses frame may further comprise a bridge to extend across a nose of a wearer. The first end connector may be mateable with the first end piece by sliding the first end connector relative to the first end piece along the first slide path in a first slide direction extending away from the bridge and towards the first end piece.

The first end piece may comprise a wall extending along at least a portion of a perimeter of the first end piece, the wall having a groove in an inner side of the wall. The first end connector may comprise a rib protruding from an outer side surface of the first end connector, the rib being slideably receivable in the groove to allow the first end connector to mate with the first end piece.

The first electrical contact may be physically coupled to a casing; and the first end piece may comprise a depression shaped to receive the casing to secure the first electrical contact to the front frame.

The front frame may further comprise a second end piece to connect to a second temple arm. The glasses frame may further comprise: a fifth electrical contact physically coupled to the front frame at the second end piece; and the second temple arm having a second end connector to connect to the second end piece. The second end connector may be slideably mateable with the second end piece along a second slide path. The second end connector may have a sixth electrical contact disposed along at least a respective portion of a second connection surface of the second end connector. Moreover, the sixth electrical contact may be to electrically connect with the fifth electrical contact when the second end connector is slideably mated with the second end piece.

The sixth electrical contact may comprise an elongated strip of conductive material oriented longitudinally along the second slide path.

The second connection surface may define a plane intersecting a longitudinal axis of the second temple arm.

One or more of: the first end connector may be mateable with the first end piece by sliding the first end connector relative to the first end piece along the first slide path in a respective first slide direction extending away from the second end piece and towards the first end piece; and the second end connector may be mateable with the second end piece by sliding the second end connector relative to the second end piece along the second slide path in a second slide direction extending away from the first end piece and towards the second end piece.

The glasses frame may further comprise an electrical connector electrically connecting the first electrical contact to the fifth electrical contact.

The glasses frame may further comprise a portable power supply physically coupled to the second temple arm and electrically connected to the sixth electrical contact.

The portable power supply may be housed inside the second temple arm.

The glasses frame may further comprise a projector physically coupled to the first temple arm, the projector to project an image onto an optical element physically coupleable to the front frame.

The projector may be housed inside the first temple arm, and the first temple arm may comprise a projection window to allow the projector to project light outside the first temple arm.

The glasses frame may further comprise the optical element, the optical element comprising a glasses lens physically coupled to the front frame proximate the first temple arm.

The portion of the first connection surface may comprise an adaptor connection surface of an adaptor, the adaptor to electrically connect a printed circuit board (PCB) receivable inside the first temple arm to the first electrical contact. The adaptor may comprise the second electrical contact and a PCB contact electrically connected to the second electrical contact. The PCB contact may be to electrically connect to at least one conductive trace carried by the PCB.

The PCB contact may be oriented substantially along a longitudinal axis of the first temple arm and the adaptor connection surface may define a plane intersecting the longitudinal axis.

The adaptor may further comprise a support member protruding from the adaptor connection surface in a same direction as the PCB contact, the support member to mechanically connect to the PCB to mechanically strengthen a connection of the PCB to the adaptor.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with portable electronic devices and head-worn devices, have not been shown or described in detail to avoid unnecessarily obscuring descriptions of the implementations.

Unless the context requires otherwise, throughout the specification and claims which follow, the word "comprise" and variations thereof, such as, "comprises" and "comprising" are to be construed in an open, inclusive sense, that is as "including, but not limited to."

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the implementations.

Figure 1:
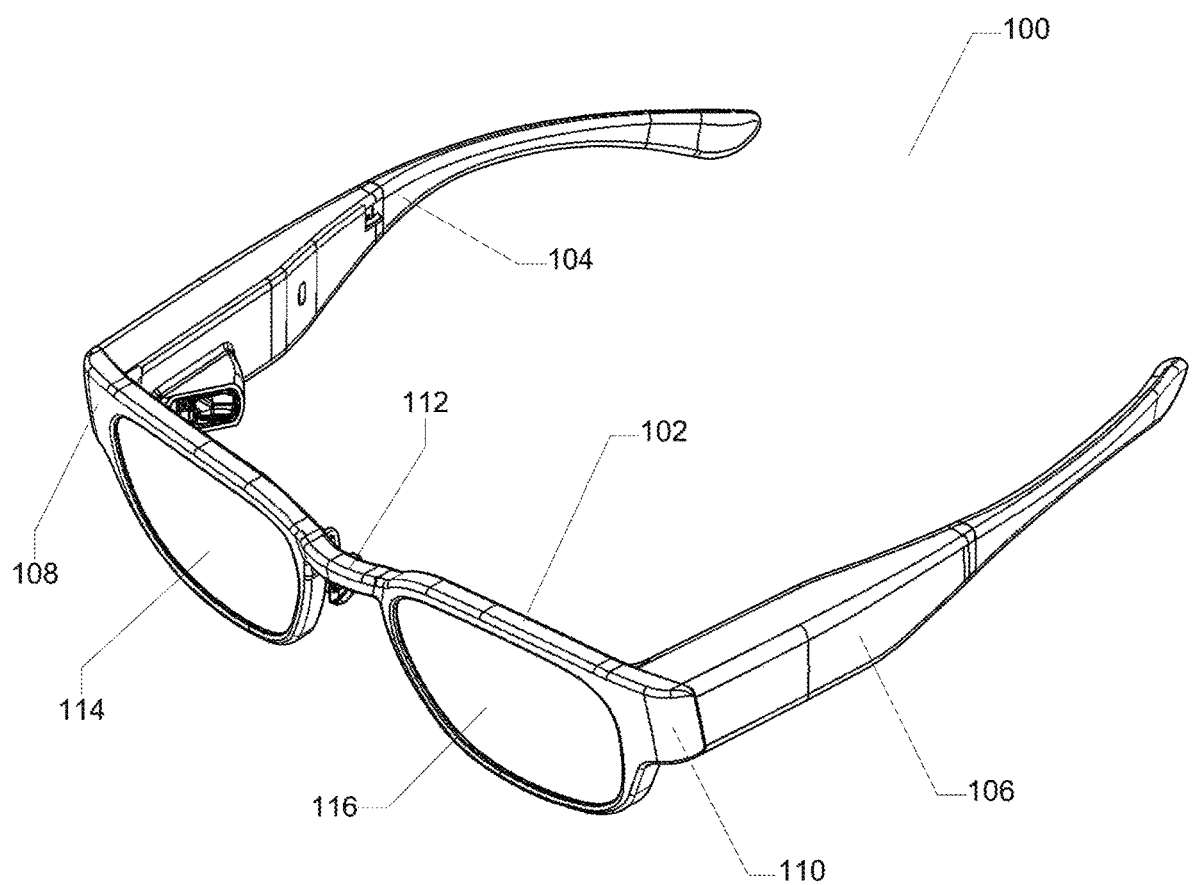
FIG. 1 shows a top perspective view of an example smart glasses, in accordance with an implementation of the present systems and devices.

FIG. 1 shows a top perspective view of an example smart glasses 100. Smart glasses 100 also functions as a wearable heads-up display (WHUD). Smart glasses 100 comprises a front frame 102, a first temple arm 104, and a second temple arm 106. Front frame 102 comprises a first end piece 108, a second end piece 110, and a bridge 112 to extend across a nose of a user. The user may be a person wearing smart glasses 100. Temple arm 104 is coupled to end piece 108 of the front frame, and temple arm 106 is coupled to end piece 110 of the front frame. End piece may generally refer to a portion of the front frame to which a temple arm is attachable or attached. Two lenses 114 and 116 are coupled to front frame 102.

Figure 2:
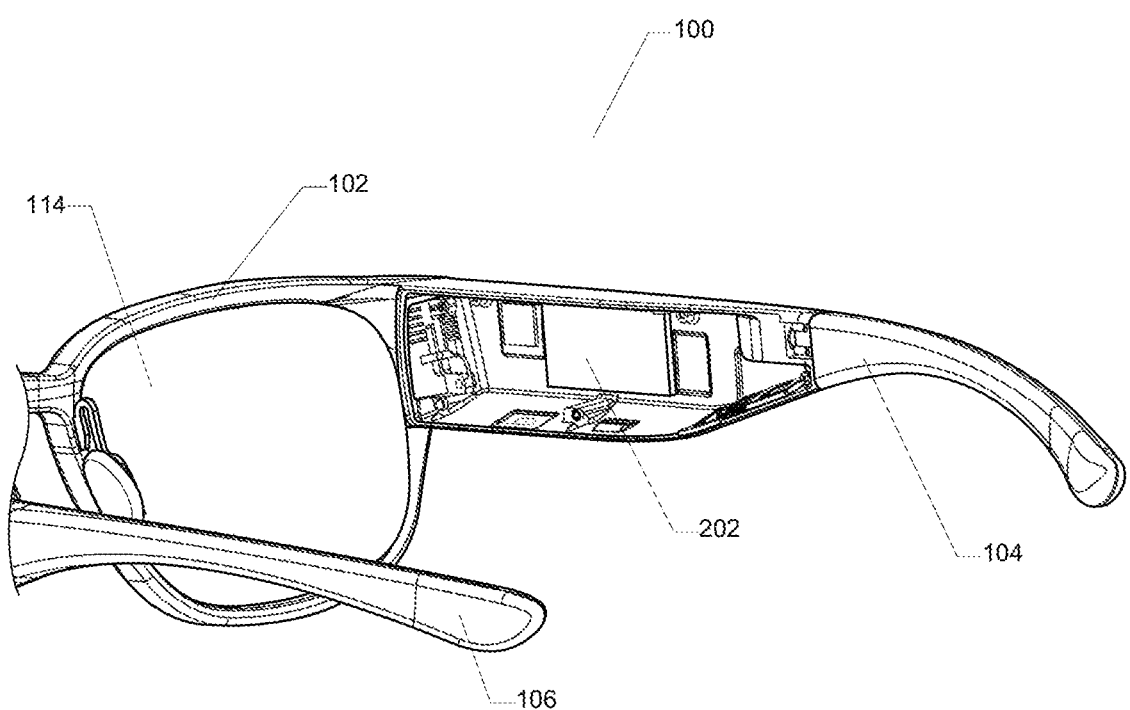
FIG. 2 shows a partial top perspective view of the smart glasses of FIG. 1.

FIG. 2 shows another partial, top perspective view of smart glasses 100, with a partial cutaway of temple arm 104. The cutaway of temple arm 104 reveals a space 202 inside temple arm 104. Space 202 may house a projector (not shown) to project an image onto lens 114. The projector may also project light onto other types of optical elements physically coupleable to front frame 102. Examples of such optical elements include holographic optical elements, and the like. Moreover, it is contemplated that in other implementations, the projector may be physically coupled to temple arm 104 in a manner other than being housed inside temple arm 104. For example, the projector may be partially received inside the temple arm, or may be secured to the outside of the temple arm. It is also contemplated that in some implementations smart glasses 100 need not comprise a projector.

Figure 3:
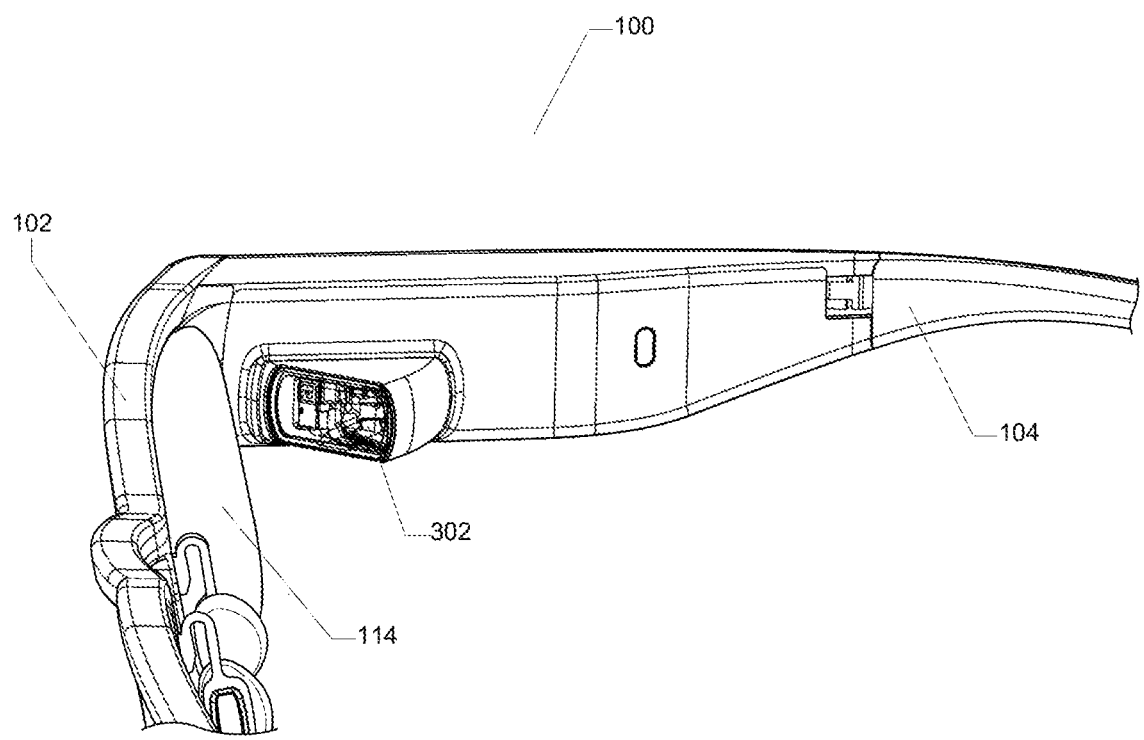
FIG. 3 shows another partial top perspective view of the smart glasses of FIG. 1.

Turning now to FIG. 3, a partial top perspective view of smart glasses 100 is shown. FIG. 3 is generally similar to FIG. 2, with a difference being that FIG. 3 shows the outer surface of temple arm 104 in place of the cutaway portion shown in FIG. 2. FIG. 3 shows a projection window 302 in temple arm 104. When the projector is housed inside temple arm 104, projection window 302 may allow the light from the projector to propagate outside temple arm 104 and towards lens 114. As shown in FIG. 1, smart glasses 100 comprises two glasses lenses 114 and 116 mechanically coupled to front frame 102. Referring back to FIG. 3, lens 114 is proximate temple arm 104 and projection window 302, and the light generated by the projector and propagating out of projection window 302 may be projected onto lens 114. It is contemplated that in other implementations the light generated by the projector may be projected onto lens 116 or onto both lenses 114 and 116.

Figure 4:
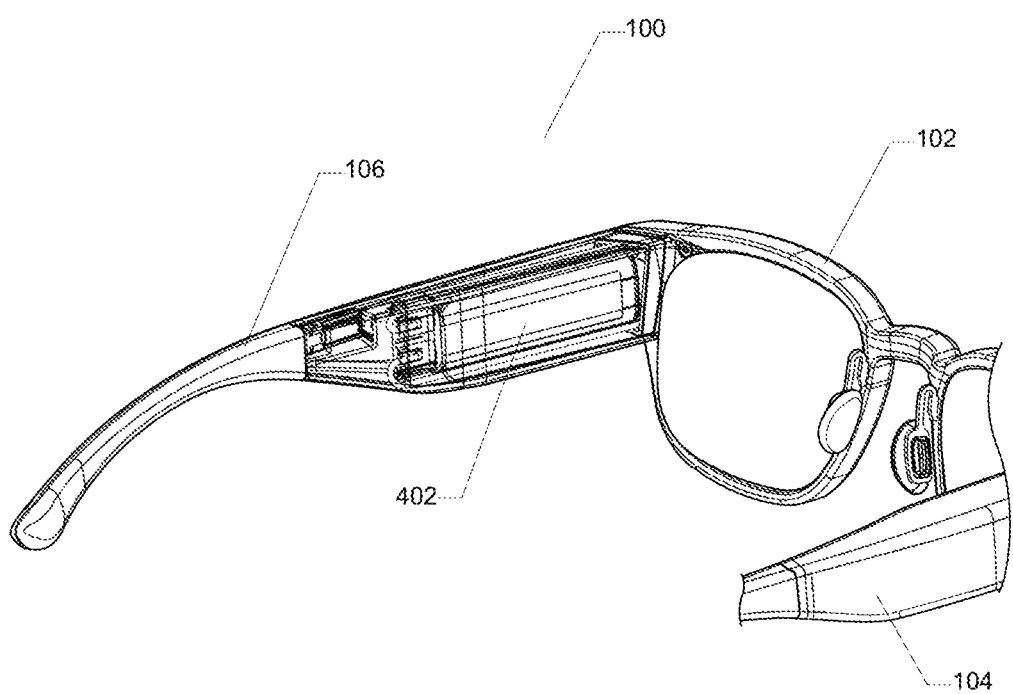
FIG. 4 shows yet another partial top perspective view of the smart glasses of FIG. 1.

FIG. 4 shows another partial, top perspective view of smart glasses 100, with a partial cutaway of temple arm 106. The cutaway of temple arm 106 reveals a space 402 inside temple arm 106. Space 402 may house a portable power supply (not shown) such as a battery and the like. It is contemplated that in other implementations, the portable power supply may be physically coupled to temple arm 106 in a manner other than being housed inside temple arm 106. For example, the portable power supply may be partially received inside the temple arm, or may be secured to the outside of the temple arm. The power supply may be used to power the projector or other electronic components onboard smart glasses 100. It is also contemplated that in some implementations temple arm 106 need not comprise a portable power supply.

Devices and systems may be used to mechanically or communicatively couple the different parts of the glasses frame together. For example, such devices and systems may be used to mechanically and communicatively couple the temple arms to the front frame. Examples of such devices and systems are described herein. The structure and function of various parts of smart glasses 100 will be described below, in order to better illustrate the structure and function of the devices and systems used for coupling those parts to one another.

Figure 5:
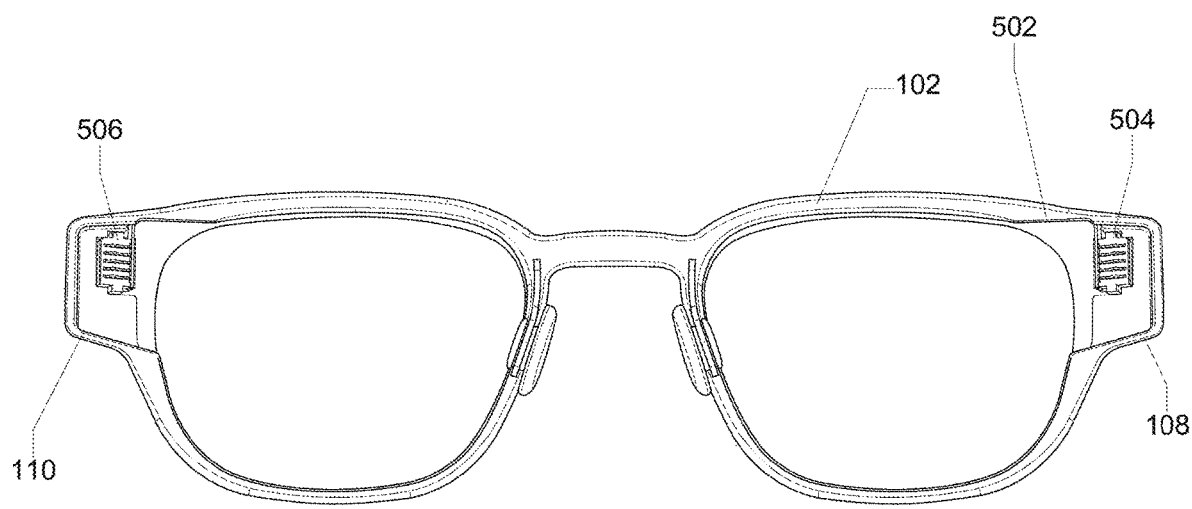
FIG. 5 shows a top plan view of an example front frame for smart glasses, in accordance with an implementation of the present systems and devices.

Turning now to FIG. 5, a top plan view of front frame 102 is shown. FIG. 5 shows end pieces 108 and 110 of front frame 102. An electrical connector 502 extends from end piece 108 to end piece 110, and may be used to deliver power or other electrical signals from one side of the of front frame 102 to another. For example, electrical connector 502 may be used to deliver power from a power supply housed in temple arm 106 towards a projector housed in temple arm 104. In some implementations, electrical connector 502 may comprise a flexible printed circuit board (PCB).

Electrical connector 502 terminates at a first casing 504 secured to front frame 102 at end piece 108 and at a second casing 506 secured to front frame 102 at end piece 110. Casings 504 and 506 each have five electrical contacts coupled to them, as described in greater detail below. Moreover, casings 504 and 506 physically couple their electrical contacts to the front frame at the end pieces, as described in greater detail below. The electrical contacts in casing 504 are connected by electrical connector 502 to the electrical contacts in casing 506. It is contemplated that in other implementations each casing may have a number of electrical contacts other than five.

Figure 6:
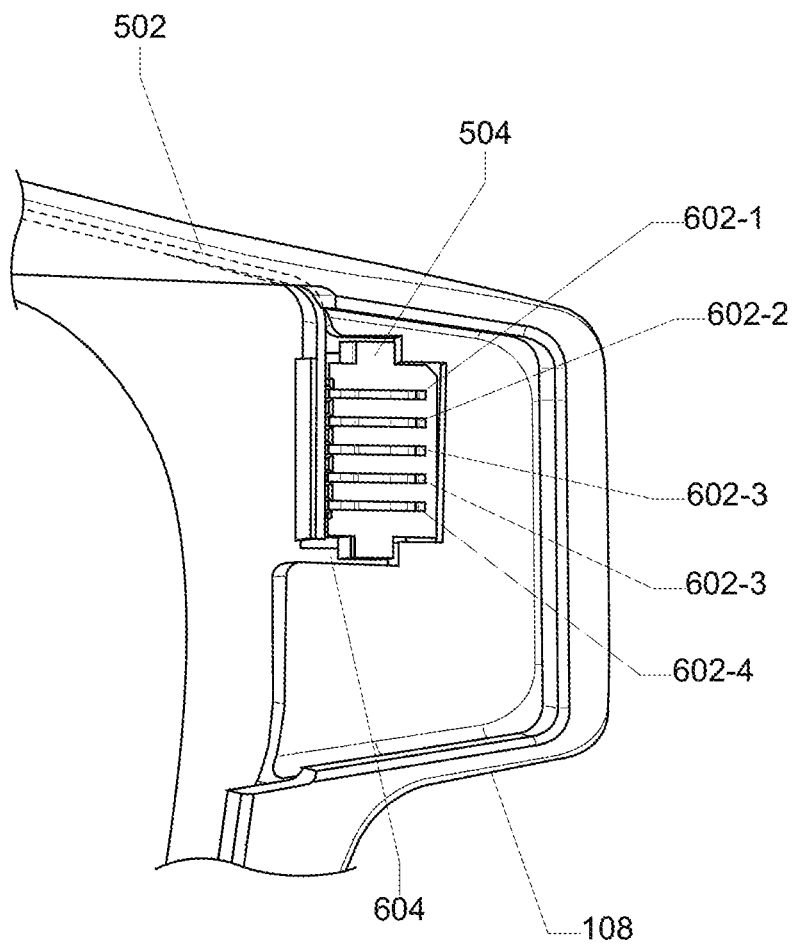
FIG. 6 shows a higher magnification of an end piece of the front frame of FIG. 5.

FIG. 6 shows end piece 108 at a higher magnification. FIG. 6 shows that casing 504 comprises five electrical contacts 602-1, 602-2, 602-3, 602-4, and 602-5 (generically or collectively referred to as electrical contacts 602). FIG. 6 also shows that casing 504 is received in a depression 604 in end piece 108. Depression 604 may be shaped and sized to receive casing 504. For example, depression 604 may have a shape complementary to the shape of casing 504 to receive casing 504 and physically secure casing 504 to end piece 108 of the front frame. While not shown in FIG. 6, similar casing, electrical contacts, and depression may exist in mirror-image for end piece 110. It is also contemplated that in some implementations end piece 108 need not comprise a depression to receive casing 504, and that casing 504 may be secured to front frame 102 using adhesives, fasteners, or the like.

Figure 7:
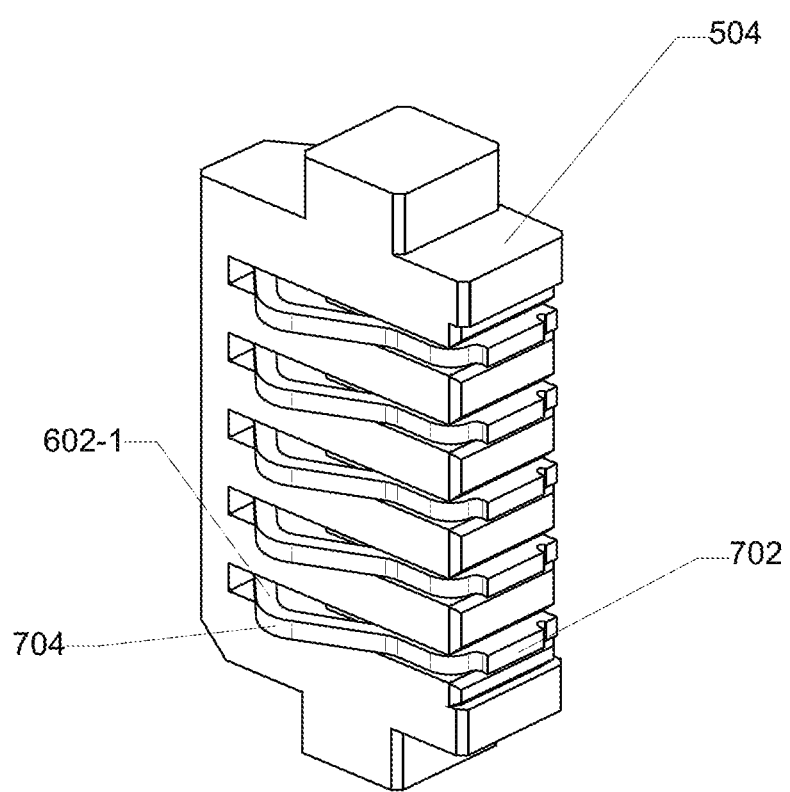
FIG. 7 shows an example casing for electrical contacts, in accordance with an implementation of the present systems and devices.
Figure 14:
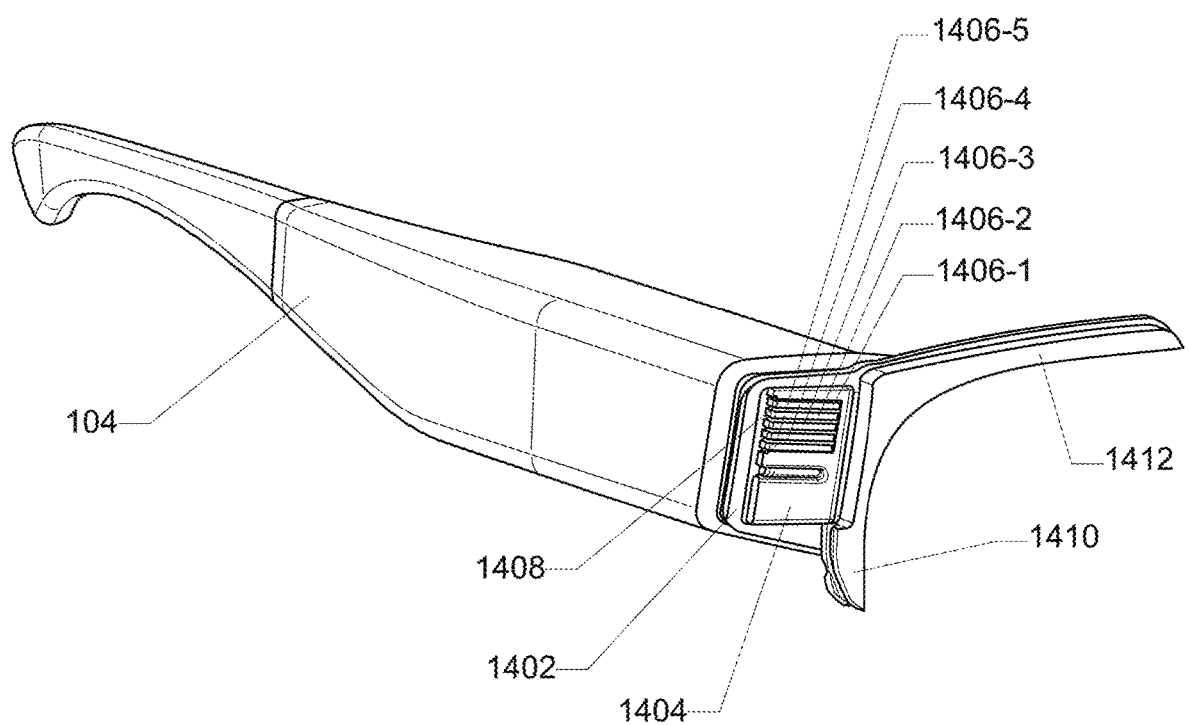
FIG. 14 shows a perspective view of an example temple arm for smart glasses, in accordance with an implementation of the present systems and devices.

Moreover, FIG. 7 shows a magnified perspective view of casing 504 and electrical contacts 602. Electrical contact 602-1 comprises a first connecting portion 702 for electrically connecting to electrical connector 502 and a second connecting portion 704 for connecting to a mating electrical connector (not shown in FIG. 7). An example of such a mating electrical connector may be electrical contact 1406-1, as shown in FIG. 14 and described in greater detail below. When mated with electrical contact 602-1, the mating electrical connector abuts connecting portion 704 thereby forming an electrical connection between the mating electrical connector and connecting portion 704 of electrical contact 602-1. The other electrical contacts 602-2, 602-3, 602-4, and 602-5 may have a structure and function similar to electrical contact 602-1. It is also contemplated that in other implementations the casing may have a shape that is different that the shape of casing 504 shown in FIG. 7.

Figure 8:
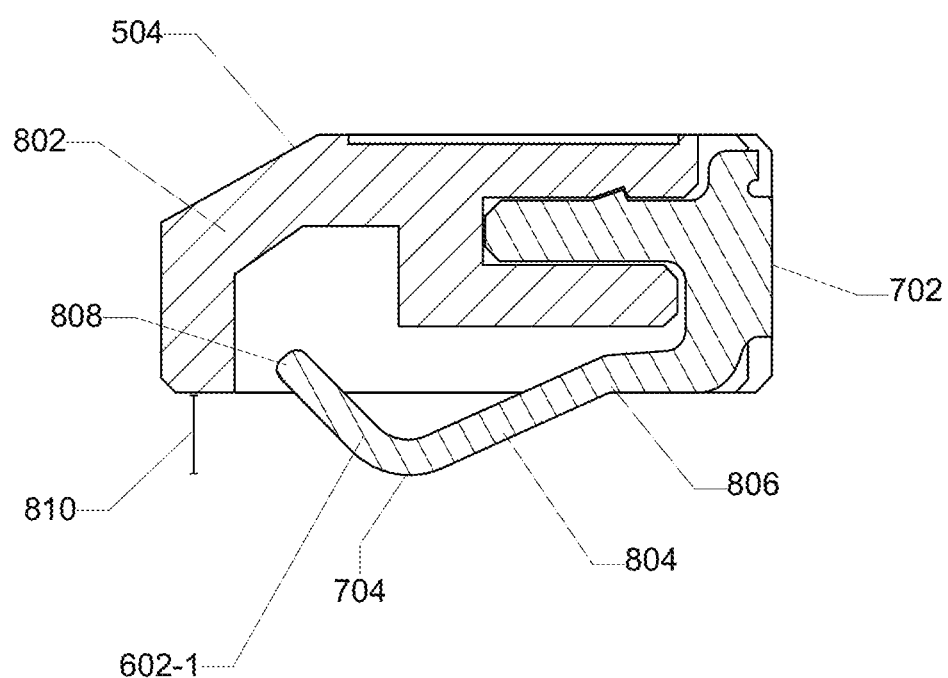
FIG. 8 shows a cross-sectional view of the casing of FIG. 7.

FIG. 8 shows a cross-sectional view of casing 504, depicting electrical contact 602-1 and its connecting portions 702 and 704. Electrical contact 602-1 is partially received and supported in an electrically insulating portion 802 of casing 504, which insulating portion 802 insulates each electrical contact 602 from the other electrical contacts 602 of casing 504. Electrical contact 602-1 comprises a cantilever 804 which extends from about region 806 to about tip 808. Connecting portion 704 may comprise a corner or bent portion of cantilever 804. Furthermore, connecting portion 704 may protrude by a distance 810 beyond a surface of insulating portion 802. Moreover, cantilever 804 is resiliently biased in a position bent about region 806, as shown in FIG. 8. The resilience of the material of electrical contact 602-1 may provide the biasing force that biases cantilever 804 it is position, as shown in FIG. 8.

When electrical contact 602-1 is mated with a mating electrical connector, the mating electrical connector may contact connecting portion 704 and push and resiliently deform cantilever 804 towards insulating portion 802. This deformation may reduce distance 810. The resilient biasing force of cantilever 804 may in turn push connecting portion 704 back against the mating electrical connector, which may in turn increase the likelihood of continued contact between connecting portion 704 and the mating electrical contact.

This may in turn facilitate uninterrupted electrical conduction between electrical contact 602-1 and the mating electrical contact.

Figure 9:
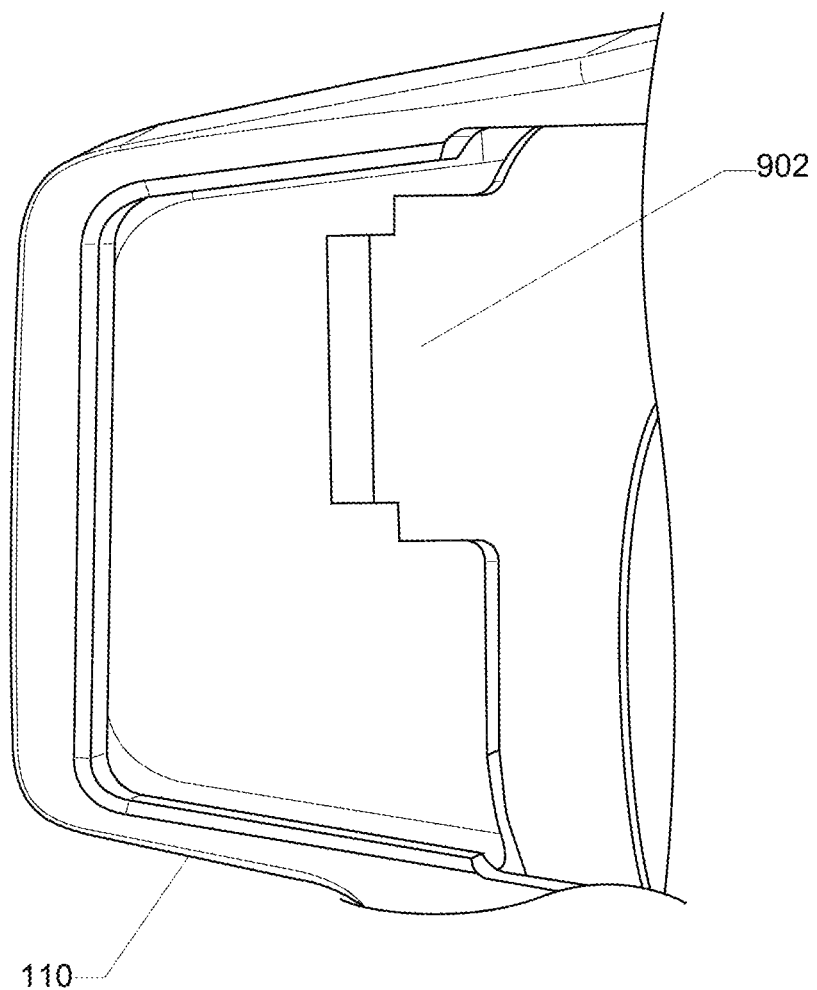
FIG. 9 shows a higher magnification, partial view of another end piece of the front frame of FIG. 5.
Figure 10:
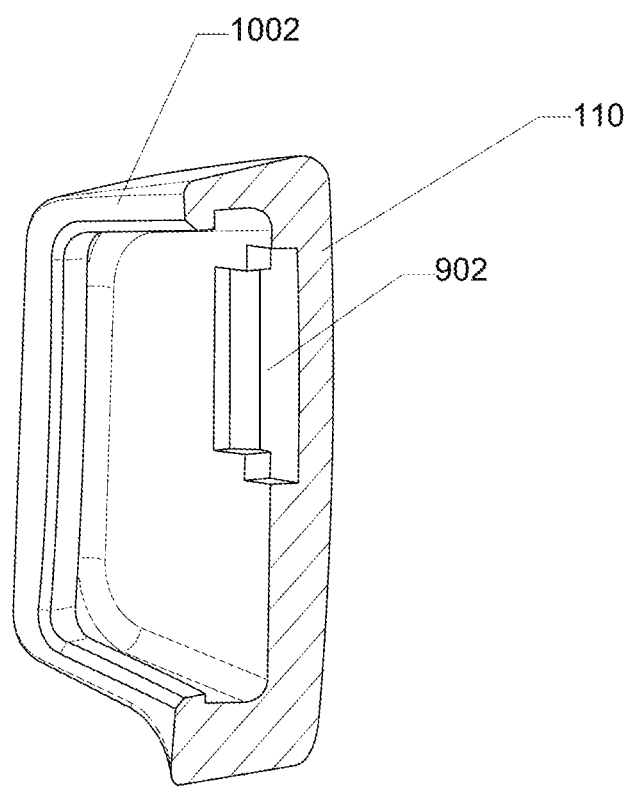
FIG. 10 shows a cross-sectional view of the end piece of FIG. 9.

FIG. 9 shows a top perspective view of end piece 110, which has a structure that is similar to and substantially the mirror image of the structure of end piece 108. FIG. 9 shows a depression 902 in end piece 110, which depression 902 is shaped and sized to receive casing 506. Depression 902 has a structure that is similar to and substantially the mirror image of the structure of depression 604 shown in FIG. 6. FIG. 10 shows a cross-sectional view of end piece 110 and depression 902 in end piece 110. As shown in FIG. 10, a wall 1002 extends along a perimeter of end piece 110. In FIG. 10, wall 1002 extends along three sides of end piece 110; the fourth side which attaches end piece 110 to the remaining portions of front frame 102 does not comprise a wall.

In other implementations, the wall need not be continuous, and may extend along a different portion of the perimeter of end piece 110. For example, the wall may extend along two opposing sides of end piece 110, and need not extend along the third side. End piece 108 may comprise a wall similar to and substantially the mirror image of wall 1002 of end piece 110.

Figure 11:
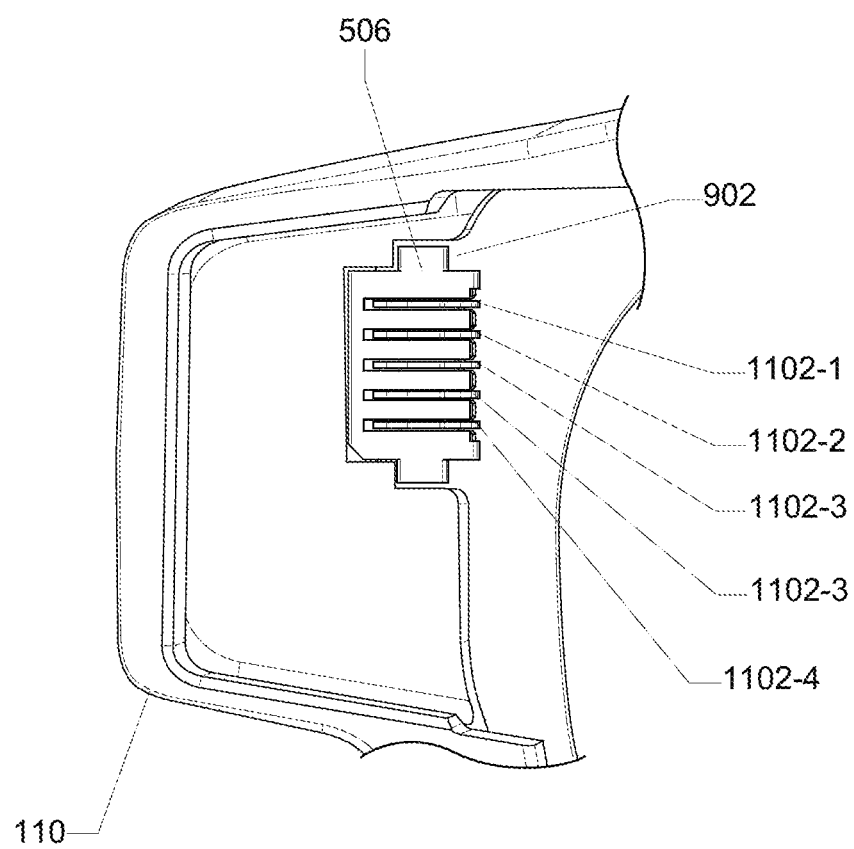
FIG. 11 shows the end piece of FIG. 9 with a casing for electrical contacts.

Furthermore, FIG. 11 shows a perspective view of end piece 110 with casing 506 received in depression 902. Similar to casing 504, casing 506 comprises five electrical contacts 1102-1, 1102-2, 1102-3, 1102-4, and 1102-5 (generically or collectively referred to as electrical contacts 1102). The function of casing 506 and its electrical contacts 1102 may be similar respectively to casing 504 and its electrical contacts 602.

Figure 12:
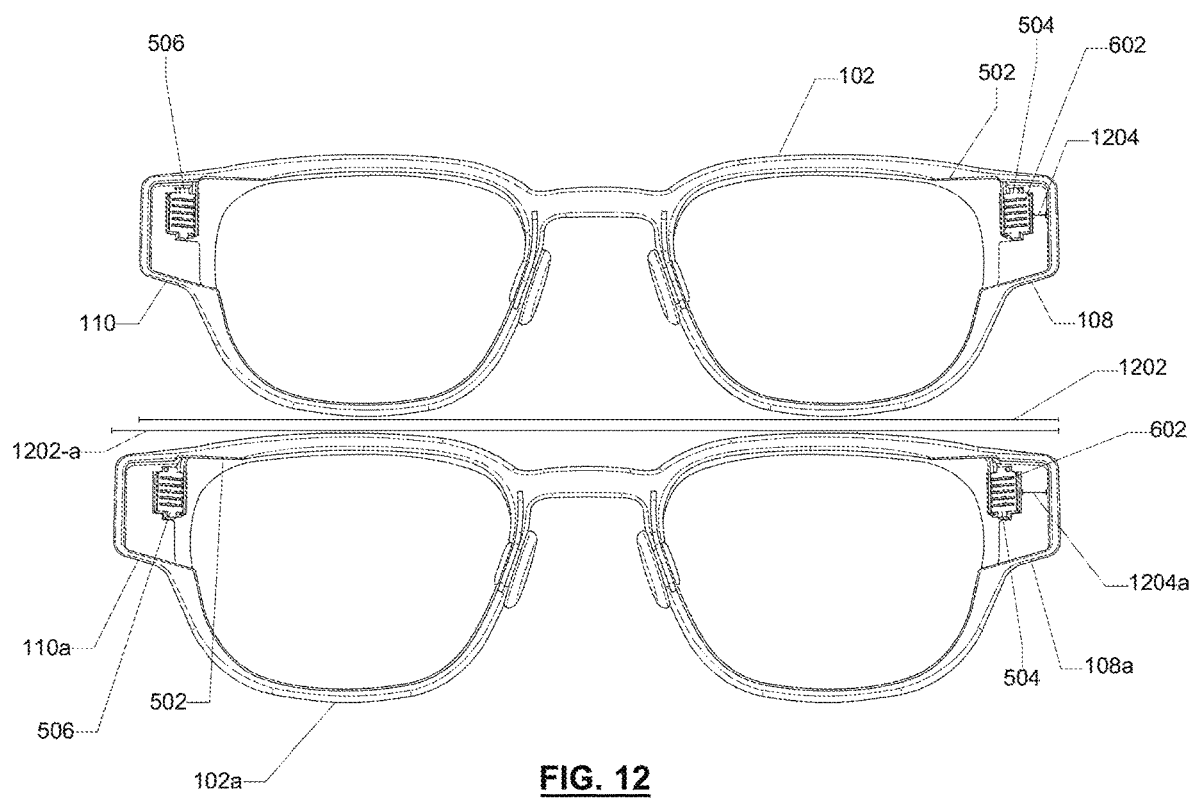
FIG. 12 shows a top plan view of two example front frames for smart glasses, in accordance with an implementation of the present systems and devices.

In order to accommodate the differences in the head and face dimensions of users, glasses generally and the smart glasses described herein may be manufactured in different sizes. FIG. 12 shows a top plan view of two smart glasses front frames 102 and 102a shown one beside the other. Front frames 102 and 102a have similar structures and components, but different lengths in the end piece-to-end piece direction. In other words, length 1202 of front frame 102 extending from end piece 108 to end piece 110 may be shorter than the corresponding length 1202a of front frame 102a extending from end piece 108a to end piece 110a.

In some implementations, varying the end piece-to-end piece length of the front frame may accommodate the differences in the head and face dimensions of the uses. This, in turn, may allow temple arms 104 and 106 (shown in FIG. 1), electrical connector 502, and casings 504 and 506 to remain unchanged in the different sizes or variations of the smart glasses. Using the same components to manufacture different sizes or variations of the smart glasses may reduce manufacturing costs and complexity. In this manner, varying the end piece-to-end piece length of the front frame while keeping the other components of the glasses frame unchanged may strike a balance between accommodating the differences in the head and face dimensions of the uses while also reducing manufacturing cost and complexity.

In order to allow for using the same temple arms for the different sizes and variations of the smart glasses, the shape and dimension of the end pieces of the front frame are also kept unchanged in different sizes of the front frame. Since end pieces are the portions of the front frame that are connectable to the temple arms, keeping the end pieces unchanged may allow for the temple arms to connect to multiple variations and sizes of the front frames.

Figure 13:
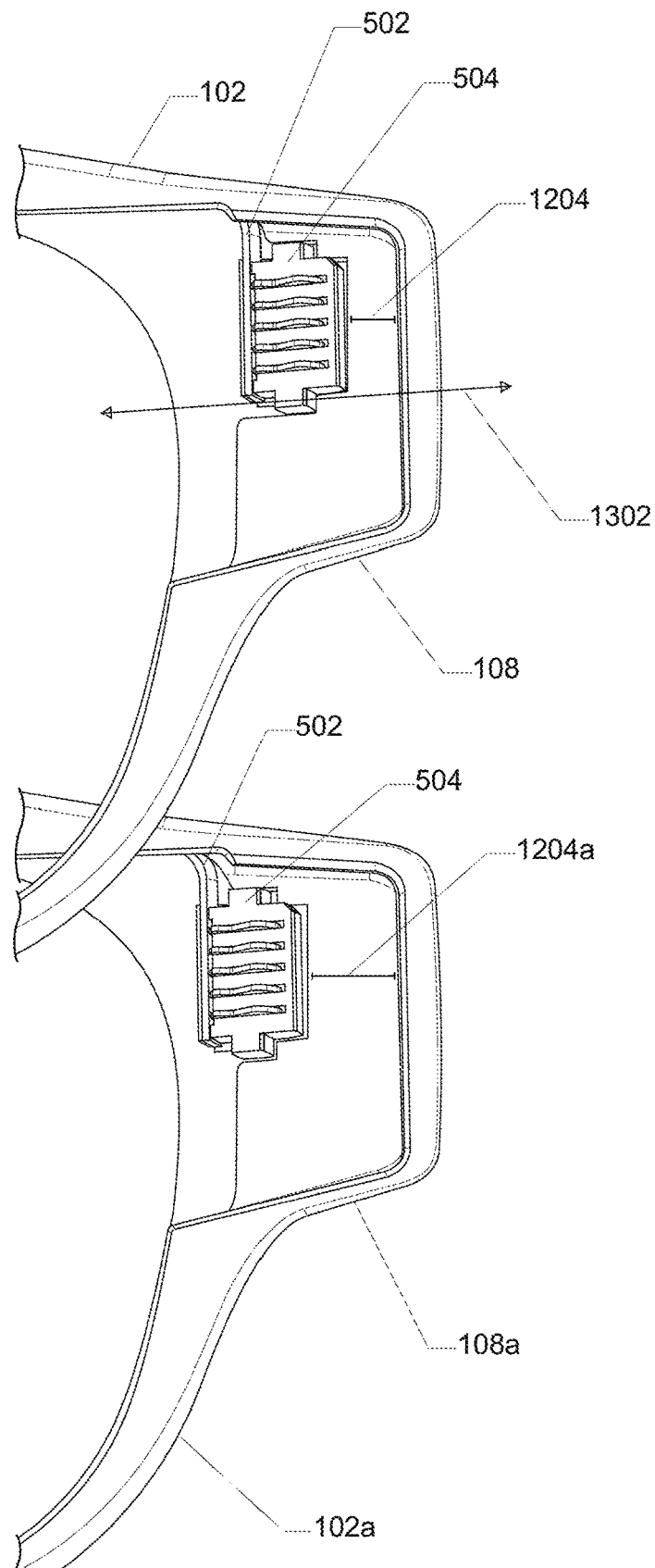
FIG. 13 shows in higher magnification two end pieces of the front frames of FIG. 12.

Since the length of electrical connector 502 and the dimensions of casings 504,506 and end pieces 108,110 remain unchanged, variations in the end piece-to-end piece length of the front frames causes the distance between the edge of the casing and the edge or perimeter of the front frame to be different in front frames of different sizes. In other words, in front frame 102, a distance 1204 between edge of casing 504 and edge of end piece 108 is smaller than a distance 1204a between edge of casing 504 and edge of end piece 108a of front frame 102a. FIG. 13 shows at a higher magnification end pieces 108 and 108a, and distances 1204 and 1204a.

The difference between distances 1204 and 1204a means that the position of electrical contacts 602 relative to end piece 108 in front frame 102 is different than the position of electrical contacts 602 relative to end piece 108a in front frame 102a. As such, the systems and devices for connecting the temple arms (which remain unchanged) to front frames (which vary at least in their end piece-to-end piece length) are to be designed in a manner that may allow the temple arms to make contact with electrical contacts 602 in spite of the variations in the position of the casings and their electrical contacts 602 relative to their respective end pieces. Such systems and devices for connecting the temple arms to front frames are described herein.

Turning now to FIG. 14, a perspective view of temple arm 104 is shown. Temple arm 104 comprises an end connector 1402 disposed at an end of temple arm 104 that is to connect to end piece 108 of front frame 102. End connector 1402 comprises a connection surface 1404 and five electrical contacts 1406-1, 1406-2, 1406-3, 1406-4, and 1406-5 (generically or collectively referred to as electrical contacts 1406) disposed along a portion of connection surface 1404.

Figure 19:
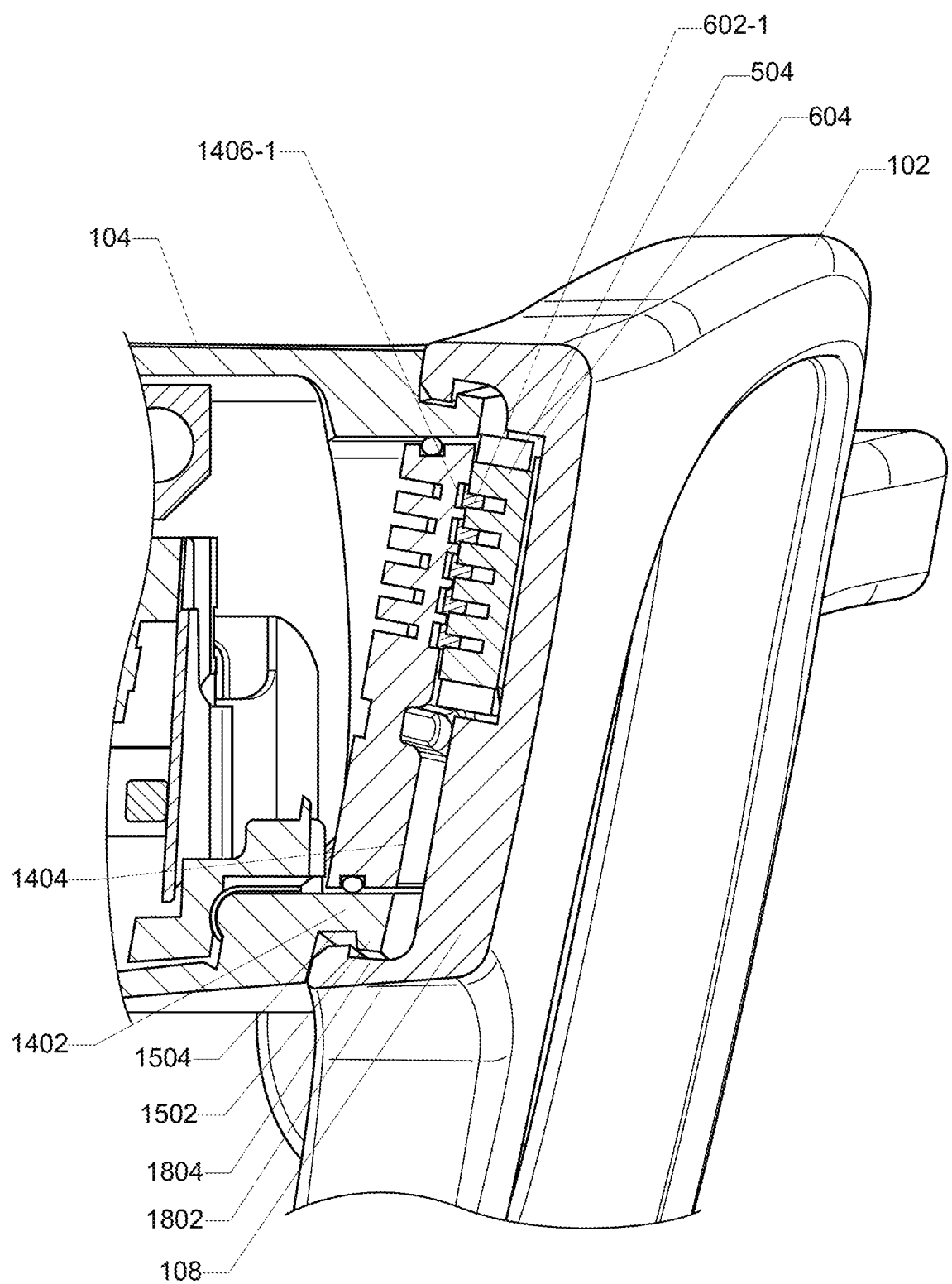
FIG. 19 shows a partial cross-sectional view of an end connector of the temple arm of FIG. 14 mated with an end piece of the front frame as shown in FIG. 6.

Electrical contacts that are disposed along the connection surface may be disposed on the connection surface, about parallel to and recessed relative to the connection surface, or about parallel to and raised relative to the connection surface. For example, electrical contacts 1406 are about parallel to and recessed relative to connection surface 1404, as can be seen in FIGS. 14 and 19. It is also contemplated that in some implementations the electrical contacts that are within the area defined by the connection surface of the end connector need not be parallel to the plane defined by the connection surface. Moreover, it is contemplated that in some implementations the end connector need not comprise a physical surface as its connection surface, and may comprise the electrical connectors which substantially lie along and define a plane, which plane may be referred to as a connection surface.

Connection surface 1404 may comprise an electrically insulating material to electrically insulate the electrical contacts 1406 from one another. In other implementations, separately formed or separately assembled insulating barriers may be used to insulate electrical contacts 1406 from one another, in addition to or instead of connection surface 1404.

End connector 1402 is slideably mateable with end piece 108 along a slide path 1302 (shown in FIG. 13), as will be described in greater detail below. Electrical contacts 1406 each comprise an elongated strip of conductive material oriented longitudinally substantially along slide path 1302. Electrical contacts 1406 are positioned within connection surface 1404 to allow them to be aligned with and come into contact with electrical contacts 602 when end connector 1402 is slideably mated with end piece 108.

As described above in relation to FIGS. 12 and 13, depending on the size or variety of the front frame, the distance between electrical contacts 602 and the edge of end piece 108 may be different. These changes and variations in the positions of electrical contacts 602 (e.g. distance 1204 versus distance 1204a), are in a direction along slide path 1302. Since electrical contacts 1406 are elongated and oriented substantially along slide path 1302, electrical contacts 1406 may contact and make an electrically conductive connection with electrical contacts 602 within a range of positions defined by the length of electrical contacts 1406.

In other words, if electrical contacts 602 are relatively closer to edge of end piece 108 (e.g. distance 1204), then the contact points between electrical contacts 602 and electrical contacts 1406 will be closer to a first end of the elongated strips of electrical contacts 1406. In FIG. 14, first end 1408 of electrical contact 1406-1 is labelled; other electrical contacts 1406 have corresponding first ends. If, on the other hand, electrical contacts 602 are relatively further from edge of end piece 108 (e.g. distance 1204a), then the contact points between electrical contacts 602 and electrical contacts 1406 will be further from the first end of the elongated strips of electrical contacts 1406. In this manner, the length of electrical contacts 1406 and their orientation substantially along slide path 1302 may allow end connector 1402 and its electrical contacts 1406 to accommodate variations in the relative positions of electrical contacts 602. This in turn allows the same, unchanging end connector structure to connect to and be used with different front frames whose electrical contacts 602 may be at different positions relative to the edge of the end piece of the front frame.

Furthermore, while FIG. 14 shows end connector 1402 as having five electrical contacts 1406, it is contemplated that in other implementations the end connector may have a number of electrical contacts other than five. Moreover, in some implementations the end connector may have a number of electrical contacts that is the same as the number of electrical contacts of the casing secured to the corresponding end piece of the front frame.

Connection surface 1404 defines a plane intersecting a longitudinal axis (not shown) of temple arm 104. This may allow connection surface 1404 and its electrical contacts 1406 to mate and connect with electrical contacts 602 at end piece 108 of front frame 102, while temple arm 104 extends out of a plane defined by front frame 102. This geometry, in turn, may allow the front frame to be positioned in front of the face and eyes of a user while the temple arm may extend along a temple of the user and away from the face of the user.

FIG. 14 also shows that temple arm 104 comprises extensions 1410 and 1412. When temple arm 104 is assembled with front frame 102, extensions 1410 and 1412 extend partially along a rim of front frame 102. The rim may comprise the portion of front frame 102 that interfaces with the optical elements, such as lenses, that are to be held in front of eye of the user. Extensions 1410 and 1412 may interface with one or both of the rim and the optical element, to secure the optical element to the rim of front frame 102.

While front frame 102 has a full rim to extend around the whole perimeter of the lenses, it is contemplated that in some implementations the front frame may comprise partial rims that extend part-way around the perimeter of lenses or other optical elements. Moreover, in some implementations, one or both of extensions 1410 and 1412 may have other functions such as acting as antennas, and the like, in addition to or instead of functioning to secure the optical elements to the front frame. Furthermore, it is contemplated that in some implementations the temple arm need not comprise extensions 1410 and 1412.

Figure 15:
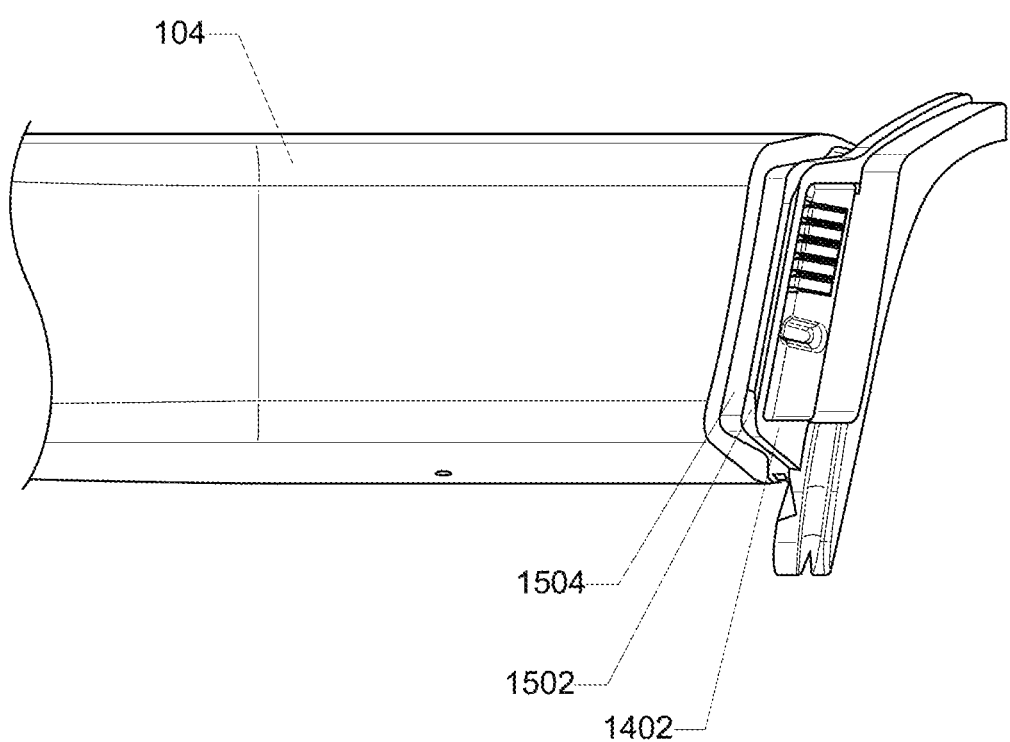
FIG. 15 shows a partial side elevation view of the temple arm of FIG. 14.

FIG. 15 shows a partial side elevation view of temple arm 104, which view shows end connector 1402. As shown in FIG. 15, end connector 1402 comprises a rib 1502 protruding from an outer side surface 1504 of end connector 1402. Rib 1502 may be continuous and may extend around the three sides of end connector 1402 visible in FIG. 15. Rib 1502 may be used to slideably mate end connector 1402 with end piece 108, as is described in greater detail below. Rib 1502 may be integrally formed with side surface 1504. In some implementations, rib 1502 may be formed separately from side surface 1504 and then secured to side surface 1504.

Figure 16:
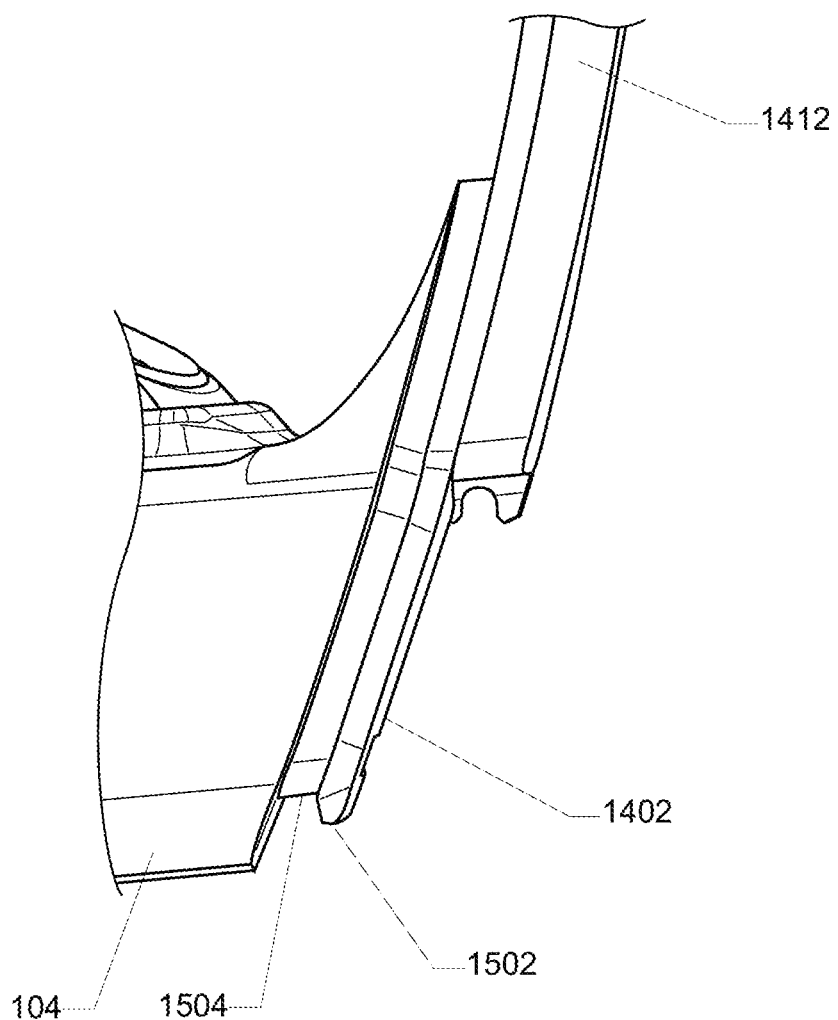
FIG. 16 shows a partial top plan view of the temple arm of FIG. 14.

In other implementations, the rib need not be continuous, or may extend around a smaller portion of the end connector. For example, in some implementations the rib may extend along two opposing sides of the end connector. Turning now to FIG. 16, a partial top plan view of temple arm 104 is shown, which view shows end connector 1402. FIG. 16 shows rib 1502 protruding from outer side surface 1504 of end connector 1402.

Figure 17:
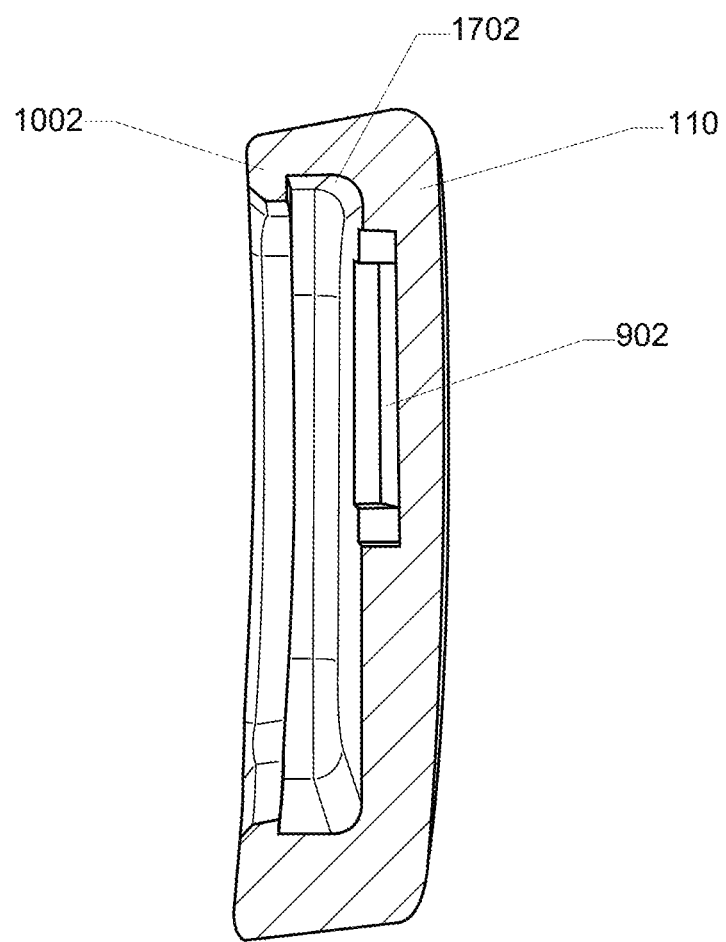
FIG. 17 shows another cross-sectional view of the end piece of FIG. 9.

Turning now to FIG. 17, a cross-sectional view of end piece 110 is shown. As shown in FIG. 17, wall 1002 comprises a groove 1702 in an inner side of wall 1002. Groove 1702 runs along the length of wall 1002. In some implementations, the groove may run along the wall on two opposing sides of the end piece, and need not run along the wall on the third side of the end piece.

Figure 18:
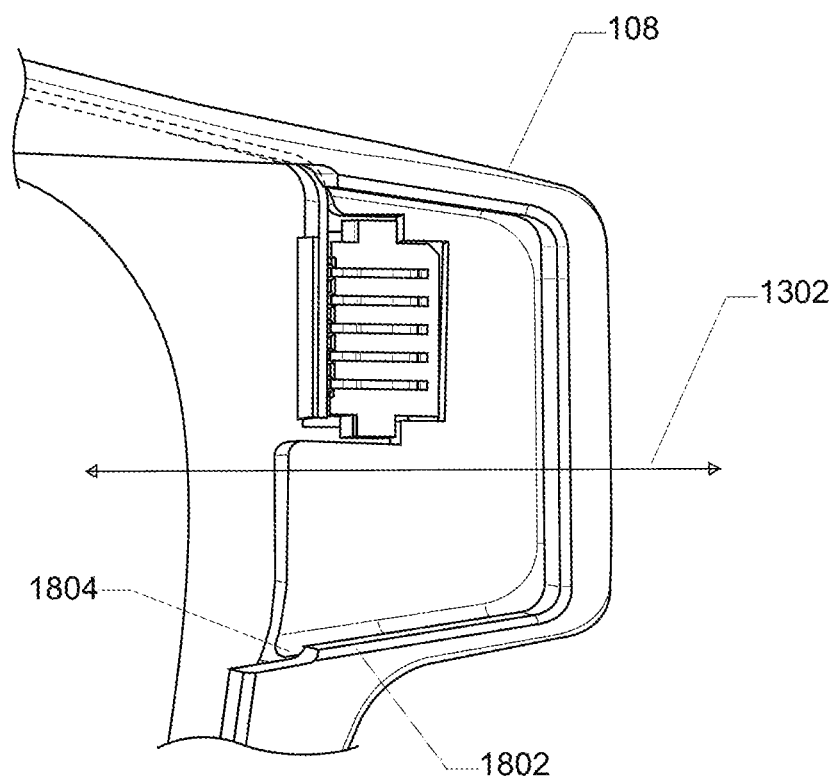
FIG. 18 shows the end piece of FIG. 6.

End piece 108 may have a structure, including the groove, that is similar to and substantially the mirror image of the structure of end piece 110. For example, FIG. 18 shows end piece 108 having a perimeter wall 1802 and a groove 1804 in the inner side of wall 1802. Wall 1802 and groove 1894 may be similar to, and substantially the mirror image of, wall 1002 and groove 1702 respectively.

Groove 1804 in wall 1802 of end piece 108 is sized and shaped to receive rib 1502 of end connector 1402. Receiving rib 1502 in groove 1804 allows for end connector 1402 to be slideably mateable with end piece 108 along slide path 1302. In order to mate end connector 1402 with end piece 108, end connector 1402 may be slid relative to end piece 108 along slide path 1302 in a slide direction extending away from the bridge of the front frame (not shown in FIG. 18, but shown in FIG. 1) and towards end piece 108. To unmate or disconnect end connector 1402 from end piece 108, end connector 1402 may be slid relative to end piece 108 along slide path 1302 in a direction opposite the slide direction, i.e. towards the bridge of the front frame.

This manner of connecting end piece 108 of front frame 102 to end connector 1402 of temple arm 104 allows for mechanically coupling and securing the temple arm to the front frame, as well as for forming an electrical connection between the temple arm and the electrical contacts 602 secured to the front frame by bringing electrical contacts 1406 of end connector 1402 into contact with electrical contacts 602.

FIG. 19 shows a partial cross-sectional view of end connector 1402 mated with end piece 108. As shown in FIG. 19, rib 1502 protruding from outer side surface 1504 of end connector 1402 is received in groove 1804 in the inner surface of wall 1802 extending along perimeter of end piece 108. Moreover, when the end connector and the end piece are mated, electrical contacts 1406 of end connector 1402 are aligned with and make contact with corresponding electrical contacts 602 of casing 504 received in depression 604 of end piece 108. For clarity, only electrical contacts 602-1 and 1406-1 are labeled in FIG. 19, and FIG. 19 shows that the other electrical contacts 602 and 1406 as well.

Moreover, the dimensions or positioning of rib 1502 and groove 1804 may be chosen to cause electrical contacts 1406 to push on and resiliently deform electrical contacts 602 when end connector 1402 is mated with end piece 108. For example, to achieve this type of pushing and resilient deformation, dimensions or positioning of rib 1502 and groove 1804 may be chosen to cause electrical contacts 1406 to be positioned at or closer than about distance 810 (shown in FIG. 8) from the surface of casing 504. As discussed above, distance 810 may be measured from the surface of casing 504 to connecting portion 704 when electrical contacts 602 are in their undeformed position. As described above, this type of pushing and deformation may increase the likelihood of a continuing contact and electrical connection between electrical contacts 602 and electrical contacts 1406.

Figure 20:
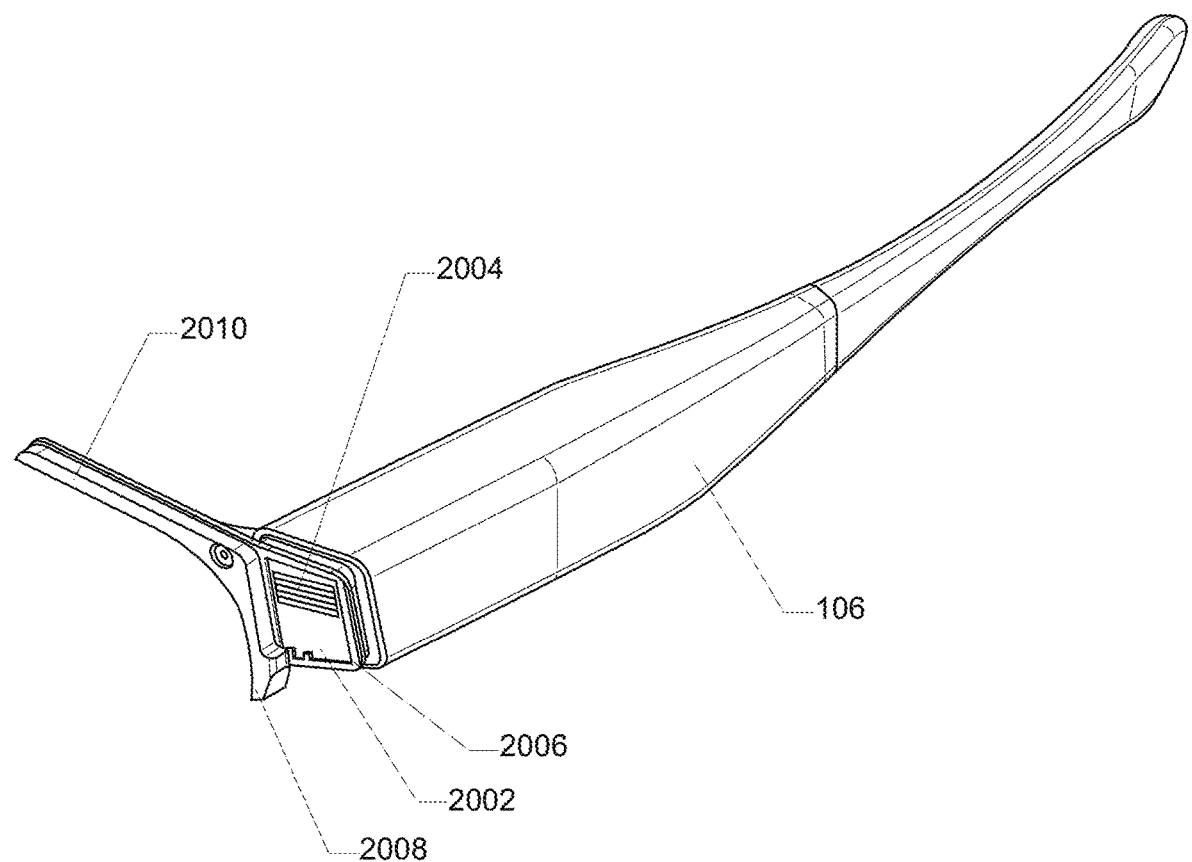
FIG. 20 shows a perspective view of another example temple arm for smart glasses, in accordance with an implementation of the present systems and devices.

Turning now to temple arm 106, as shown in FIG. 20 temple arm 106 may have an end connector 2002 comprising electrical contacts 2004 and rib 2006. End connector 2002 may function similarly to end connector 1402, and may have a structure that is similar to and substantially the mirror image of the structure of end connector 1402. End connector 2002 may be slideably mateable with end piece 110 in a manner similar to and substantially the mirror image of the manner of the slideable mating described herein in relation to end connector 1402 and end piece 108.

Since the structure of end connector 2002 and end piece 110 are substantially the mirror image of end connector 1402 and end piece 108, end connector 2002 and end piece 110 may be mateable with one another along a second slide direction that is also substantially the mirror image of the first slide direction for mating end connector 1402 and end piece 108. In some implementations, the first slide direction extends substantially away from end piece 110 and towards end piece 108 and the second slide direction extends substantially away from end piece 108 and towards end piece 110.

When end connector 2002 is mated with end piece 110, electrical contact 2004 may come into contact with corresponding electrical contacts 1102 (shown in FIG. 11). Moreover, temple arm 106 may comprise extensions 2008 and 2010, which may have functions similar to extensions 1410 and 1412 of temple arm 104. In some implementations, temple arm 106 need not comprise extensions 2008 and 2010.

End connector 2002 has been described as having a function that is similar to that of end connector 1402, and a structure that is similar to and substantially the mirror image of the structure of end connector 1402; however, it is contemplate that in some implementations end connector 2002 may have a function or structure that is different than the function or structure of end connector 1402.

Figure 21:
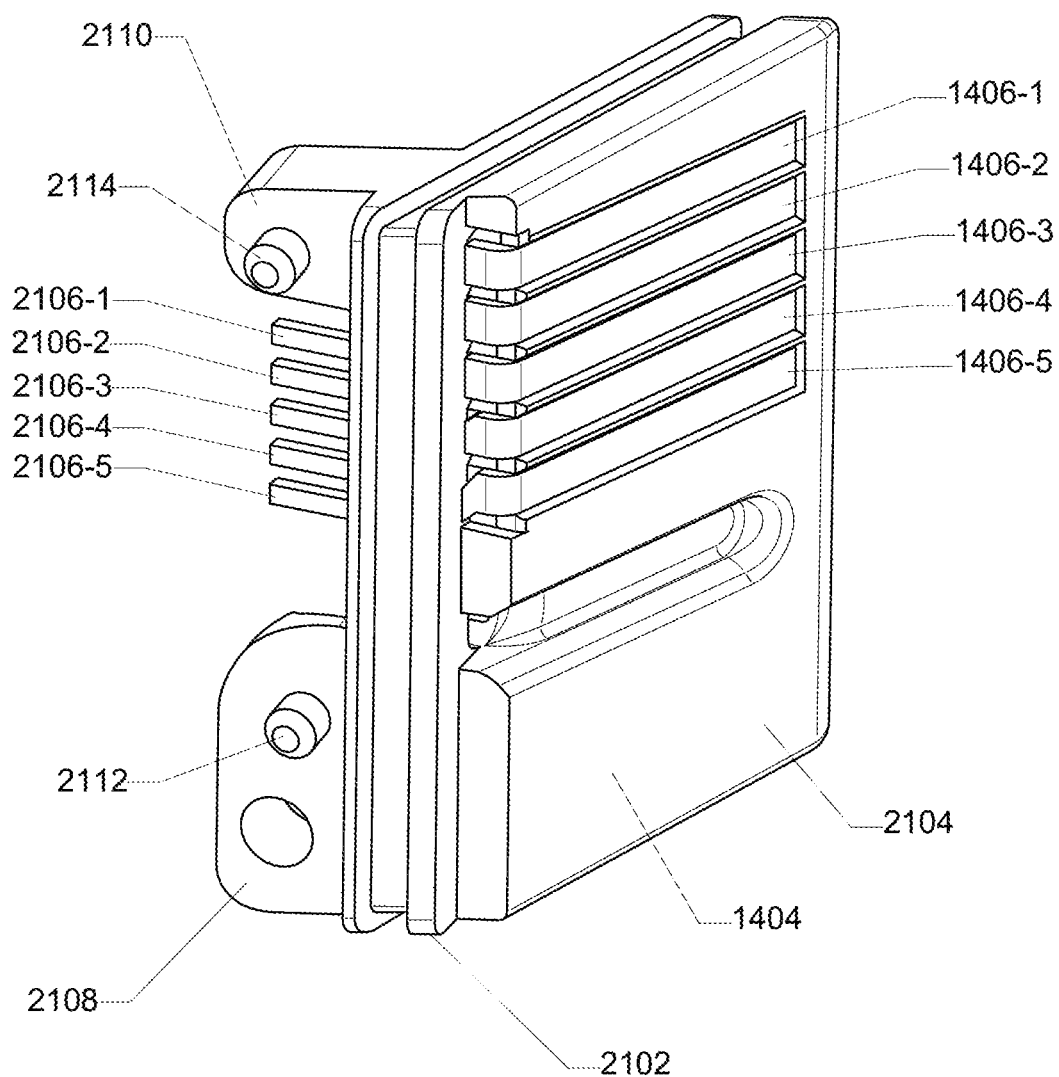
FIG. 21 shows a perspective view of an example adaptor, in accordance with an implementation of the present systems and devices.

Turning now to FIG. 21, a perspective view of an example adaptor 2102 is shown. In the implementations shown in FIGS. 14 and 21, adaptor 2102 is a component of end connector 1402. In other implementations, not shown, end connector 1402 need not comprise adaptor 2102 as one of its components. Adaptor 2102 may be used to provide an electrical connection between end connector 1402 and a printed circuit board (PCB) 2202 (shown in FIG. 22) receivable or received inside temple arm 104.

Adaptor 2102 comprises an adaptor connection surface 2104, which is in the case of adaptor 2102 the same as connection surface 1404 of end connector 1402. In other implementations, the adaptor connection surface may comprise a portion of the connection surface of the end connector. Adaptor 2102 further comprises electrical contacts 1406-1, 1406-2, 1406-3, 1406-4, and 1406-5 which are electrically connected respectively to PCB contacts 2106-1, 2106-2, 2106-3, 2106-4, and 2106-5 (generically or collectively referred to as PCB contacts 2106). In some implementations, each of electrical contacts 1406 and its corresponding PCB contact 2106 may be formed as a contiguous piece of conductive material.

PCB contacts 2106 are to connect to corresponding conductive traces (not shown) carried by PCB 2202. When adaptor 2102 is assembled as part of end connector 1402 of temple arm 104, PCB contacts 2106 may be oriented substantially along the longitudinal axis of temple arm 104, and adaptor connection surface 2104 may define a plane intersecting the longitudinal axis of temple arm 104. This orientation may allow PCB contacts 2106 to connect with an elongated PCB 2202 received inside temple arm 104 and oriented along the longitudinal axis of temple arm 104, while also allowing electrical contacts 1406 to be oriented to connect with electrical contacts 602 when end connector 1402 is mated with end piece 108.

Adaptor 2102 also comprises support members 2108 and 2110 protruding from adaptor connection surface 2104 in substantially the same direction as PCB contacts 2106. The support members protruding from the adaptor connection surface may include the support members protruding from a first side of an adaptor member whose second side, opposite the first side, provides the adaptor connection surface. Moreover, it is contemplated that in some implementations support members 2108 and 2110 need not be oriented in substantially the same direction as PCB contacts 2106. In such implementations, the support members may protrude from the first side of the adaptor member in a direction away from the second side of the adaptor member.

Figure 22:
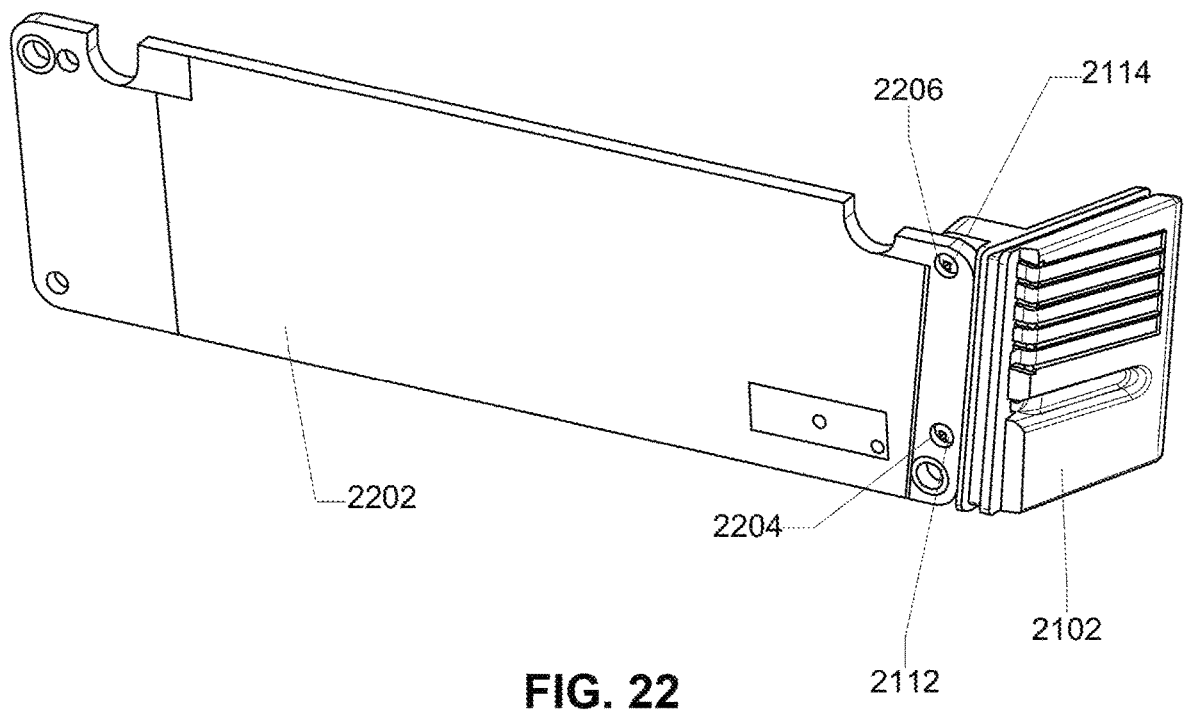
FIG. 22 shows the adaptor of FIG. 21 connected to a printed circuit board.

In adaptor 2102, pegs 2112 and 2114 protrude from support members 2108 and 2110 respectively. As shown in FIG. 22, support members 2108 and 2110 are mechanically coupled to PCB 2202 by pegs 2112 and 2114 being received respectively in openings 2204 and 2206 of PCB 2202. In other implementations, adhesives or other fasteners may be used to mechanically couple PCB 2202 to support members 2108 and 2110. While the electrical connection between PCB contacts 2106 and PCB 2202 also mechanically couples adaptor 2102 to PCB 2202, support members 2108 and 2110 being mechanically coupled to PCB 2202 may mechanically strengthen the connection between adaptor 2102 and PCB 2202.

It is also contemplated that in some implementations the support members may have a different number, shape, or position of pegs. In other implementations, the support members need not have pegs. Moreover, in some implementations the adaptor may have a different number, shape, or positions of support members. In some implementations, the adaptor need not comprise support members.

In some implementations, end connector 2002 may comprise an adaptor that has a function that is similar to the function of adaptor 2102, and a structure that is similar to and substantially the mirror image of the structure of adaptor 2102.

End connectors 1402 and 2002 allow temple arms 104 and 106 respectively to be mechanically coupled to front frame 102. In addition, end connectors 1402 and 2002 allow temple arms 104 and 106 to be communicatively coupled with one another via electrical connector 502. This may allow power to be sent from the power supply in temple arm 106 to the projector in temple arm 104. In addition, electrical signals such as control signals may also be communicated from one temple arm to the other.

While the drawings show the casings and the end connectors as having five electrical contacts each, it is contemplated that in other implementations the casings or the end connectors may have a number of connectors other than five.

In addition, in other implementations the casings and their electrical connectors need not have the structures shown in FIGS. 6-8, and the casings and their electrical connectors may have a different suitable structure.

Moreover, it is contemplated that in some implementations the end connector may be integrally formed with its corresponding temple arm. In other implementations the end connector may comprise a separate component or assembly of components that is then connected to its corresponding temple arm. As such, the end connector may be described as a device or system for connecting a temple arm to the front frame of a glasses frame.

In addition, the end connector need not comprise electrical contacts, in which case the end connector may be used to connect the temple arm to the front frame of glasses which are not smart glasses or are not powered. Moreover, in some implementations the end connector and the end piece need not use a rib and groove mechanism to connect with one another, and may be mateable with one another using snap fittings, fasteners, and the like. It is also contemplated that in some implementations the end connectors described herein may be used in applications or devices other than glasses frames.

Furthermore, in some implementations the glasses frames or smart glasses frames need not comprise two temple arms, and may comprise fewer components. For example, the glasses frames may comprise one temple arm, or the front frame may be dimensioned to extend across one eye of the user. In addition, it is contemplated that in other implementations the position of the end pieces in the front frame may be different that those shown in the drawings.

Throughout this specification and the appended claims the term "communicative" as "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Moreover, throughout this specification and the appended claims, infinitive verb forms are often used. Examples include, without limitation: "to connect," "to extend," "to mate," "to receive," and the like. Unless the specific context requires otherwise, such infinitive verb forms are used in an open, inclusive sense, that is as "to, at least, connect," to, at least, extend," "to, at least, mate," and so on.

The above description of illustrated implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. The teachings provided herein of the various implementations can be applied to other portable and/or wearable electronic devices, not necessarily the exemplary wearable electronic devices generally described above. Moreover, the various implementations described above can be combined to provide further implementations.

In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A glasses frame comprising:
a front frame having a first end piece to connect to a first temple arm;
a first electrical contact physically coupled to the front frame at the first end piece,
the first temple arm having a first end connector to connect to the first end piece, the first end connector slideably mateable with the first end piece along a first slide path, the first end connector having a second electrical contact disposed along at least a portion of a first connection surface of the first end connector, the second electrical contact to electrically connect with the first electrical contact when the first end connector is slideably mated with the first end piece;
a third electrical contact physically coupled to the front frame at the first end piece, the third electrical contact electrically insulated from the first electrical contact and
the first end connector further comprising a fourth electrical contact comprising a respective elongated strip of conductive material extending along at least a respective portion of the first connection surface and oriented longitudinally along the first slide path, the fourth electrical contact electrically insulated from the second electrical contact, the fourth electrical contact to electrically connect with the third electrical contact when the first end connector is slideably mated with the first end piece.

2. The glasses frame of claim 1, wherein the second electrical contact comprises an elongated strip of conductive material oriented longitudinally along the first slide path.

3. The glasses frame of claim 1, wherein the first connection surface defines a plane intersecting a longitudinal axis of the first temple arm.

4. The glasses frame of claim 1, further comprising:
a bridge to extend across a nose of a wearer; and
wherein the first end connector is mateable with the first end piece by sliding the first end connector relative to the first end piece along the first slide path in a first slide direction extending away from the bridge and towards the first end piece.

5. The glasses frame of claim 1, wherein:
the first end piece comprises a wall extending along at least a portion of a perimeter of the first end piece, the wall having a groove in an inner side of the wall; and
the first end connector comprises a rib protruding from an outer side surface of the first end connector, the rib slideably receivable in the groove to allow the first end connector to mate with the first end piece.

6. The glasses frame of claim 1, wherein:
the first electrical contact is physically coupled to a casing; and
the first end piece comprises a depression shaped to receive the casing to secure the first electrical contact to the front frame.

7. The glasses frame of claim 1,
wherein the front frame further comprises a second end piece to connect to a second temple arm; and
the glasses frame further comprises:
a fifth electrical contact physically coupled to the front frame at the second end piece; and the second temple arm having a second end connector to connect to the second end piece, the second end connector slideably mateable with the second end piece along a second slide path, the second end connector having a sixth electrical contact disposed along at least a respective portion of a second connection surface of the second end connector, the sixth electrical contact to electrically connect with the fifth electrical contact when the second end connector is slideably mated with the second end piece.

8. The glasses frame of claim 7, wherein the sixth electrical contact comprises an elongated strip of conductive material oriented longitudinally along the second slide path.

9. The glasses frame of claim 7, wherein the second connection surface defines a plane intersecting a longitudinal axis of the second temple arm.

10. The glasses frame of claim 7, wherein one or more of:
the first end connector is mateable with the first end piece by sliding the first end connector relative to the first end piece along the first slide path in a respective first slide direction extending away from the second end piece and towards the first end piece; and
the second end connector is mateable with the second end piece by sliding the second end connector relative to the second end piece along the second slide path in a second slide direction extending away from the first end piece and towards the second end piece.

11. The glasses frame of claim 7, further comprising an electrical connector electrically connecting the first electrical contact to the fifth electrical contact.

12. The glasses frame of claim 11, further comprising a portable power supply physically coupled to the second temple arm and electrically connected to the sixth electrical contact.

13. The glasses frame of claim 12, wherein the portable power supply is housed inside the second temple arm.

14. The glasses frame of claim 12, further comprising a projector physically coupled to the first temple arm, the projector to project an image onto an optical element physically coupleable to the front frame.

15. The glasses frame of claim 14, wherein the projector is housed inside the first temple arm, and the first temple arm comprises a projection window to allow the projector to project light outside the first temple arm.

16. The glasses frame of claim 14, further comprising the optical element, the optical element comprising a glasses lens physically coupled to the front frame proximate the first temple arm.

17. The glasses frame of claim 1, wherein the portion of the first connection surface comprises an adaptor connection surface of an adaptor, the adaptor to electrically connect a printed circuit board (PCB) receivable inside the first temple arm to the first electrical contact, the adaptor comprising the second electrical contact and a PCB contact electrically connected to the second electrical contact, the PCB contact to electrically connect to at least one conductive trace carried by the PCB.

18. The glasses frame of claim 17, wherein the PCB contact is oriented substantially along a longitudinal axis of the first temple arm and the adaptor connection surface defines a plane intersecting the longitudinal axis.

19. The glasses frame of claim 18, wherein the adaptor further comprises a support member protruding from the adaptor connection surface in a same direction as the PCB contact, the support member to mechanically connect to the PCB to mechanically strengthen a connection of the PCB to the adaptor.

20. A glasses frame comprising:
a front frame having a first end piece to connect to a first temple arm;
a casing coupled to the front frame at the first end piece;
a first electrical contact physically coupled to the casing, the first electrical contact comprising a first connecting portion to electrically connect with an electrical connector situated within at least the first end piece; and
the first temple arm having a first end connector to connect to the first end piece, the first end connector slideably mateable with the first end piece along a first slide path, the first end connector having a second electrical contact disposed along at least a portion of a first connection surface of the first end connector, the second electrical contact to electrically connect with a second connecting portion of the first electrical contact when the first end connector is slideably mated with the first end piece,
wherein the casing comprises an electrically insulating portion to receive and electrically insulate the second connecting portion the first electrical contact when the second electrical contact contacts the second connecting portion the first electrical contact.

* * * * *